(12) United States Patent
Shimura

(10) Patent No.: US 7,839,270 B2
(45) Date of Patent: Nov. 23, 2010

(54) VEHICLE MONITORING SYSTEM AND TRANSPONDER THEREOF

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 473 days.

(21) Appl. No.: 11/722,689

(22) PCT Filed: Mar. 22, 2006

(86) PCT No.: PCT/JP2006/305714

§ 371 (c)(1),
(2), (4) Date: Jun. 22, 2007

(87) PCT Pub. No.: WO2006/103993

PCT Pub. Date: Oct. 5, 2006

(65) Prior Publication Data

US 2010/0019881 A1    Jan. 28, 2010

(30) Foreign Application Priority Data

Mar. 28, 2005 (JP) .............................. 2005-090850

(51) Int. Cl.
*G08B 21/00* (2006.01)
(52) U.S. Cl. .................. 340/431; 340/442; 340/443; 340/444; 340/445; 340/446; 340/447; 340/448; 340/449; 340/506; 340/539.1; 455/7; 455/9; 455/13.1; 455/14; 455/15; 375/211; 375/220; 701/29; 714/18
(58) Field of Classification Search ......... 340/442–449, 340/506, 539.1, 539.22–539.29; 455/7, 9, 455/13.1, 14, 15; 375/211, 220; 701/29; 714/18
See application file for complete search history.

(56) References Cited

U.S. PATENT DOCUMENTS 5,717,135 A    2/1998 Fiorletta et al.

FOREIGN PATENT DOCUMENTS

JP         06-255436        9/1994

(Continued)

OTHER PUBLICATIONS

International Search Report for PCT/JP2006/305714 dated Jun. 26, 2006.

*Primary Examiner*—Davetta W Goins
*Assistant Examiner*—Ojiako Nwugo
(74) *Attorney, Agent, or Firm*—Knobbe Martens Olson & Bear, LLP.

(57) ABSTRACT

A vehicle monitoring system which may easily identify information transmitted from each of detecting devices without registration of identification information of the detecting devices and a transponder thereof are provided. A display is disposed in a distal end of the transponders all connected in series through a cable. Each of the detecting devices detects conditions in a predetermined portion of a vehicle and transmits vehicle information including measurement results, its own identification information and the number of transmissions. Each of the transponders determines whether the vehicle information transmitted from the detecting devices is received or not based on the identification information of the detecting devices registered in advance, and transmits the vehicle information to the transponder connected to the transmitting side or the display, when it determines that the vehicle information is to be received. Also, the each transponder receives the vehicle information transmitted from the transponder connected to the receiving side, updating the number of transmissions included in the vehicle information and transmits the vehicle information to the transponder connected to the transmitting side or the display.

19 Claims, 13 Drawing Sheets

FOREIGN PATENT DOCUMENTS

| | | |
|---|---|---|
| JP | 11-235910 | 8/1999 |
| JP | 2002-516399 | 6/2002 |
| JP | 2003-002019 | 1/2003 |
| JP | 2003-509260 | 3/2003 |
| JP | 2003-528378 | 9/2003 |
| JP | 2003-291615 | 10/2003 |
| JP | 2004-299534 | 10/2004 |
| JP | 2004-534204 | 11/2004 |
| JP | 2005-112342 | 4/2005 |
| JP | 2006-021660 | 1/2006 |

*Fig.* 8
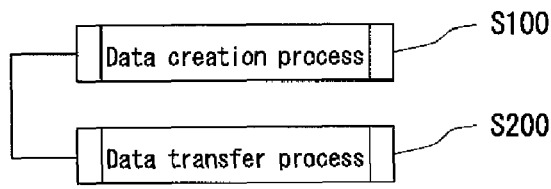
*Fig.* 9
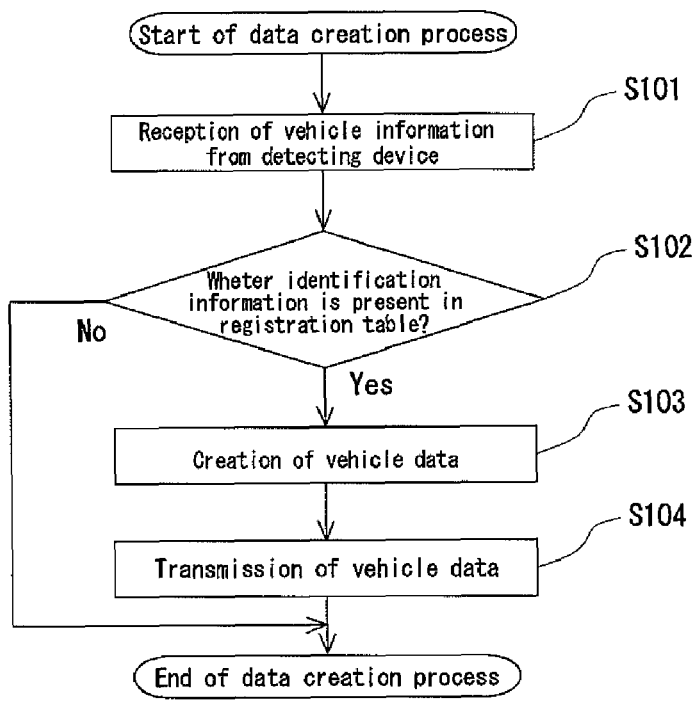
*Fig.* 10
| Location code | Detecting device ID | 1st air pressure | 2nd air pressure | 1st temperature | 2nd temperature |
|---|---|---|---|---|---|
| A 1 1 | XXXXXXXK | 1010 | 510 | 51 | 101 |
| A 1 2 | XXXXXXXL | 1020 | 520 | 52 | 102 |
| A 1 3 | XXXXXXXM | 1030 | 530 | 53 | 103 |
| A 1 4 | XXXXXXXN | 1040 | 540 | 54 | 104 |

Fig. 13

| ID code | The number of transmissions | Detected air pressure | Air pressure warning | Detected temperature | Temperature warning |
|---------|---|------|---|----|---|
| A 0 1 | 0 | 1250 | 1 | 40 | 1 |
| A 0 2 | 1 | 1250 | 1 | 40 | 1 |
| A 0 3 | 2 | 1250 | 1 | 40 | 1 |
| A 0 4 | 2 | 1250 | 1 | 40 | 1 |
| A 0 5 | 3 | 1250 | 1 | 40 | 1 |
| A 0 6 | 3 | 1250 | 1 | 40 | 1 |
| A 0 7 | 4 | 1250 | 1 | 40 | 1 |
| A 0 8 | 4 | 1250 | 1 | 40 | 1 |
| A 0 9 | 4 | 1250 | 1 | 40 | 1 |
| A 1 0 | 4 | 1250 | 1 | 55 | 2 |
| A 1 1 | 5 | 1250 | 1 | 40 | 1 |
| A 1 2 | 5 | 1250 | 1 | 40 | 1 |
| A 1 3 | 5 | 511 | 3 | 40 | 1 |
| A 1 4 | 5 | 1250 | 1 | 40 | 1 |

| Communication code | Communication line ID |
|---|---|
| A Y Y | XXXXXXYY |
| A Z Z | XXXXXXZZ |

VEHICLE MONITORING SYSTEM AND TRANSPONDER THEREOF

CROSS REFERENCE TO RELATED APPLICATIONS

This application claims to benefit and priority to and is a U.S. National Phase of PCT International Application Number PCT/JP2006/305714, filed on Mar. 22, 2006, designating the United States of America, which claims priority under U.S.C. §119 to Japanese Application 2005-90850 filed on Mar. 28, 2005. The disclosures of the above-referenced applications are hereby incorporated by this reference in their entirety.

TECHNICAL FIELD

The present invention relates to a vehicle monitoring system for monitoring conditions in a vehicle, such as a tire pressure, temperature or the like, and more particularly, to a system that can be used for a combination vehicle, and a transponder thereof.

BACKGROUND ART

Usually, a check for conditions in a vehicle such as a tire air pressure etc. is an essential operation for running safety of vehicle. However, a manual check is a troublesome task, then a vehicle monitoring system for automatically monitoring conditions in a vehicle such as the tire air pressure etc. has been developed and also entered into an actual operation in a combination vehicle (hereinafter, a tow vehicle is referred to as "tractor", and a towed vehicle as "trailer").

Conventionally, with regard to such a vehicle monitoring system, for example, a system is proposed (e.g. Patent Document 1) in which a sensor unit (detecting device) for detecting a tire pressure and temperature of each tire of a tractor and trailer sends a wireless signal directly or through a transponder in the trailer to a cab unit (transponder) in the tractor, and the cab unit which receives information of the tire pressure and temperature displays the received information on a display (display unit) to inform an operator of warnings and the like. Also, a system is proposed (e.g. Patent Document 2) in which a tag (detecting device) formed by a combination of a responder beacon, pressure sensor and the like and provided for each of tires measures and transmits a RF (Radio Frequency) signal having its measurement results, then a monitor provided adjacent to each of the tires receives the RF signal, each of monitors is connected to a computer (transponder) provided in a vehicle through a data bus, and the computer (transponder) translates the RF signal transmitted from the tag of each tire to send information to a central display (display unit).

However, when the trailer towed by the tractor is replaced, if identification information of a plurality of detecting devices provided in a new trailer is not registered, the vehicle monitoring system disclosed in Patent Document 1 or 2 would not identify each of the detecting devices provided in the trailer, therefore the display provided in the tractor may not identify and display information transmitted from each of the detecting devices.

In order to address this problem, for example a system is provided (e.g. Patent Document 3) in that when the trailer towed by the tractor is replaced, environmental data is reconfigured by connecting an electric key to a central unit (transponder) in the tractor, which key stores the environmental data including the identification information and the like of each of modules (detecting device) in the trailer.

Patent Document 1: National Publication of International Patent Application No. 2002-516399
Patent Document 2: National Publication of International Patent Application No. 2003-509260
Patent Document 3: Japanese Patent Publication No. H6-255436

DISCLOSURE OF THE INVENTION

Problems to be Solved by the Invention

However, in the vehicle monitoring system disclosed in Patent Document 3, radio waves transmitted from all of the modules (detecting device) are received by an antenna provided in the central unit (transponder) of the tractor, but because an electric field intensity caused by a high frequency output of the module (detecting device) is limited to 500 μV/m at a distance of 3 m from the module (detecting device) by the Radio Regulation Law in Japan, it is not easy for the antenna provided in the central unit (transponder) of the tractor to receive the radio waves transmitted from the modules (detecting device) of the trailer in a long transmitting and receiving pathway such as between the tractor and trailer.

Considering the above issues, an object of the present invention is to provide a vehicle monitoring system and a transponder thereof which may easily identify information transmitted from each of detecting devices without necessity for registration of the identification information of the detecting devices.

Means for Solving the Problems

Therefore, the present invention proposes, in order to achieve the above object, a vehicle monitoring system comprising: a plurality of detecting devices for detecting conditions in a predetermined portion of a vehicle and transmitting measurement results of them; a plurality of transponders for receiving the measurement results transmitted from the at least one detecting devices respectively and transmitting the measurement results; and a display for receiving the measurement results transmitted from the plurality of the transponders and displaying the measurement results, wherein: the display is disposed in a distal end of the plurality of the transponders all of which are connected in series through a cable; a predetermined detecting device includes means for transmitting vehicle information including at least the measurement results and its own identification information; and each of the transponders includes determination means for determining whether the vehicle information transmitted from the detecting devices has to be received or not based on the identification information of the at least one detecting devices registered in advance, transmission means for adding the number of transmissions to the vehicle information and transmitting the vehicle information to the transponder connected to the transmitting side or the display, when the determination means determines that the vehicle information is to be received, and transfer means for receiving the vehicle information transmitted from the transponder connected to the receiving side, updating the number of transmissions included in the vehicle information and transmitting the vehicle information to the transponder connected to the transmitting side or the display.

Also, the present invention proposes, in order to achieve the above object, a transponder, being one of a plurality of transponders connected in series through a cable, receiving vehicle information from a predetermined detecting device of detecting devices for detecting conditions in a predetermined portion of a vehicle, which predetermined detecting device transmits the vehicle information including at least measurement results and its own identification information, and transmitting the vehicle information, comprising: determination means for determining whether the vehicle information transmitted from the detecting devices is received or not based on the identification information of the at least one detecting devices registered in advance; transmission means for adding the number of transmissions to the vehicle information and transmitting the vehicle information to the transponder connected to the transmitting side, when the determination means determines that the vehicle information is to be received; and transfer means for receiving the vehicle information transmitted from the transponder connected to the receiving side, updating the number of transmissions included in the vehicle information and transmitting the vehicle information to the transponder connected to the transmitting side.

According to the present invention, the display which receives the vehicle information in the distal end of the transponders all connected in series through the cable can identify the transponder which originally transmits the vehicle information based on the number of transmissions included in the vehicle information, because only the vehicle information transmitted from the detecting devices registered in advance is received by the transponders, and the number of transmissions included in the vehicle information is updated every time the vehicle information transmitted from the transponder on the receiving side is transferred to the transponder on the transmitting side or the display.

ADVANTAGES OF THE INVENTION

According to the vehicle monitoring system and its transponder according to the present invention, the display which receives the vehicle information in the distal end of the transponders all connected in series through the cable can identify the transponder which originally transmits the vehicle information based on the number of transmissions included in the vehicle information, therefore, for example, when the trailer towed by the tractor is replaced, the detecting device can be easily identified based on the number of transmissions and the identification information included in the vehicle information transmitted from the transponders without registration on the display of the identification information of each of detecting devices provided in a new trailer.

The above objects, another objects, features and advantages of the present invention will be apparent from the following explanation and the accompanying drawings.

BRIEF DESCRIPTION OF THE DRAWINGS

FIG. 8 is a schematic view illustrating a processing configuration of the transponder in the first embodiment according to the present invention;

FIG. 9 is a flow chart illustrating the data creation process shown in FIG. 8;

FIG. 10 is a view for explaining a registration table stored in the transponder in the first embodiment according to the present invention;

FIG. 13 is a view for explaining a registration table stored in the display in the first embodiment according to the present invention;

DESCRIPTION OF SYMBOLS

Figure 1:
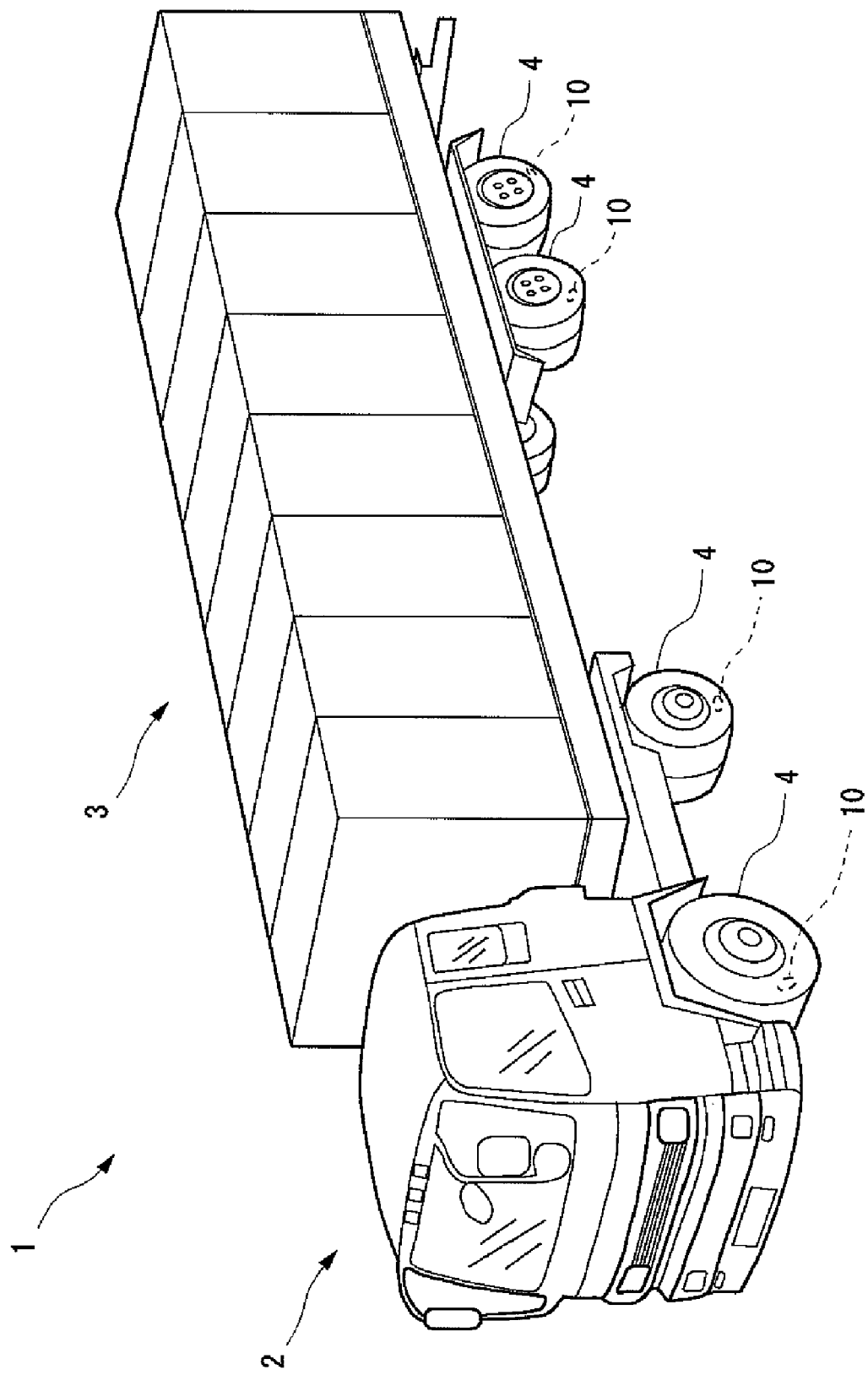
FIG. 1 is an external perspective view of a combination vehicle which installs a vehicle monitoring system in a first embodiment according to the present invention.

1 . . . Combination vehicle
2 . . . Tractor
3 . . . Trailer
4 . . . Tire
5 . . . Vehicle power supply
10, 10A . . . Detecting device
11 . . . Central processing portion
111 . . . CPU
112 . . . D/A conversion circuit
113 . . . Memory portion
12 . . . Sensor portion
121 . . . First sensor
122 . . . Second sensor
123 . . . Switch
124 . . . A/D conversion circuit
13 . . . Transmitting portion
131 . . . Oscillating circuit
132 . . . Modulation circuit
133 . . . High frequency amplifying circuit
14 . . . Antenna
15 . . . Power supply
16 . . . Switch
20, 20A to 20F . . . Transponder
21 . . . Antenna
22 . . . Wave detection portion
221 . . . Diode
222 . . . A/D conversion circuit
23 . . . Central processing portion
231 . . . CPU
232 . . . Memory portion
24 . . . Rechargeable battery
30 . . . Display
31 . . . Central processing portion
311 . . . CPU 312 . . . Memory portion
32 . . . Display portion
33 . . . Display panel
331 . . . Attaching location display
332 . . . Transponder display
333 . . . LED
334 . . . Numeric display
335 . . . Attaching location display switching button
336 . . . Transponder display switching button
40 . . . Cable
41 . . . Signal line
42 . . . Power wire
43a, 43b . . . Communication line
50, 50A . . . Registration table
51 . . . Location code
51A . . . Communication code
52 . . . Detecting device ID
52A . . . Communication line ID
53 . . . First air pressure
54 . . . Second air pressure
55 . . . First temperature
56 . . . Second temperature
60 . . . Vehicle data
61 . . . Preamble
62 . . . Data portion
62a . . . The number of transmissions
62b . . . ID code
62c . . . Measurement results
62d . . . Warning
63 . . . CRC
70 . . . Memory table
71 . . . ID code
72 . . . The number of transmissions
73 . . . Detected air pressure
74 . . . Air pressure warning
75 . . . Detected temperature
76 . . . Temperature warning
S100 . . . Data creation process
S200 . . . Data transfer process

BEST MODE FOR CARRYING OUT THE INVENTION

The present invention will be explained hereinafter in relation to one embodiment with reference to the drawings.

Figure 2:
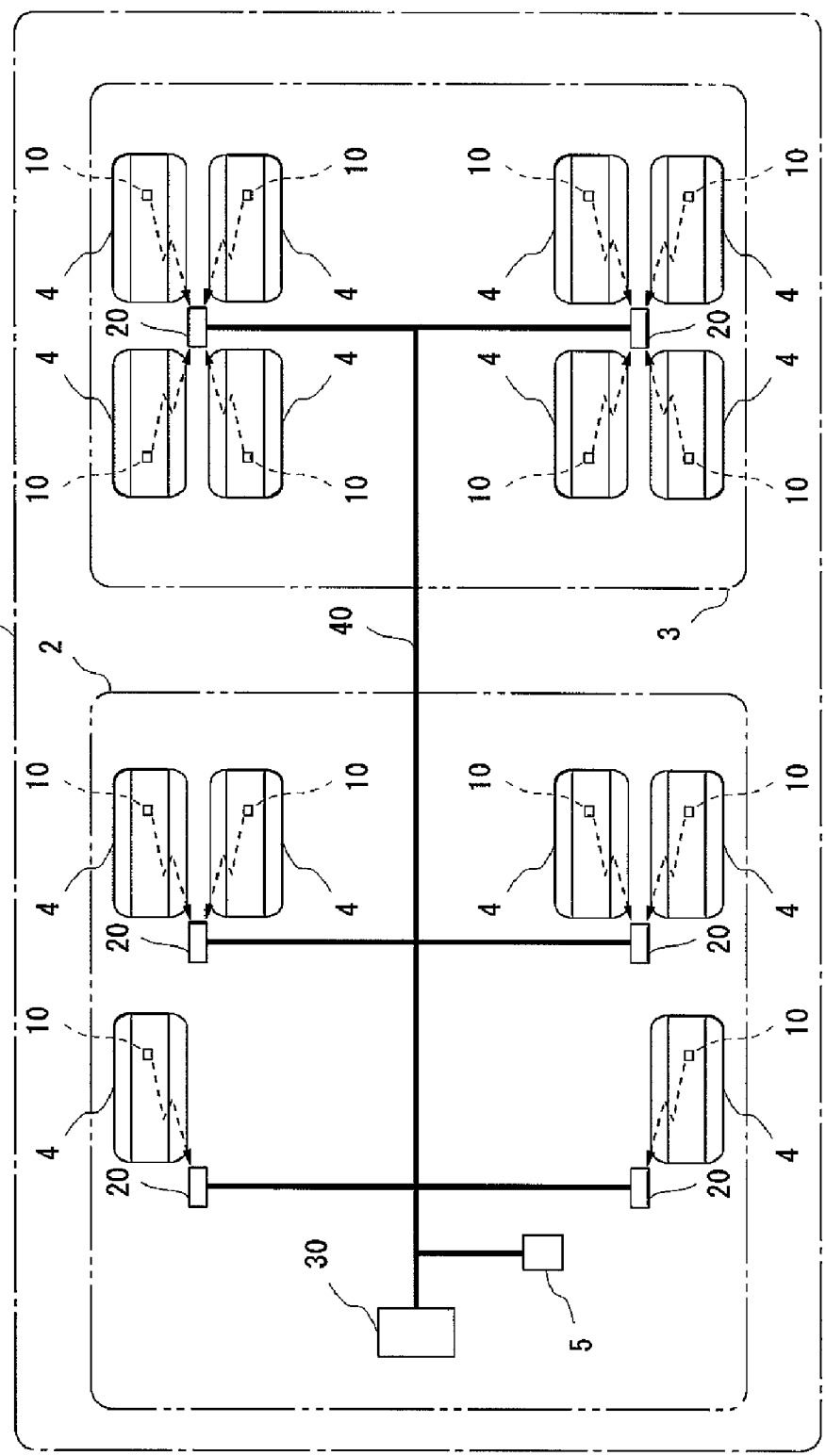
FIG. 2 is a top view of the vehicle monitoring system shown in FIG. 1.
Figure 3:
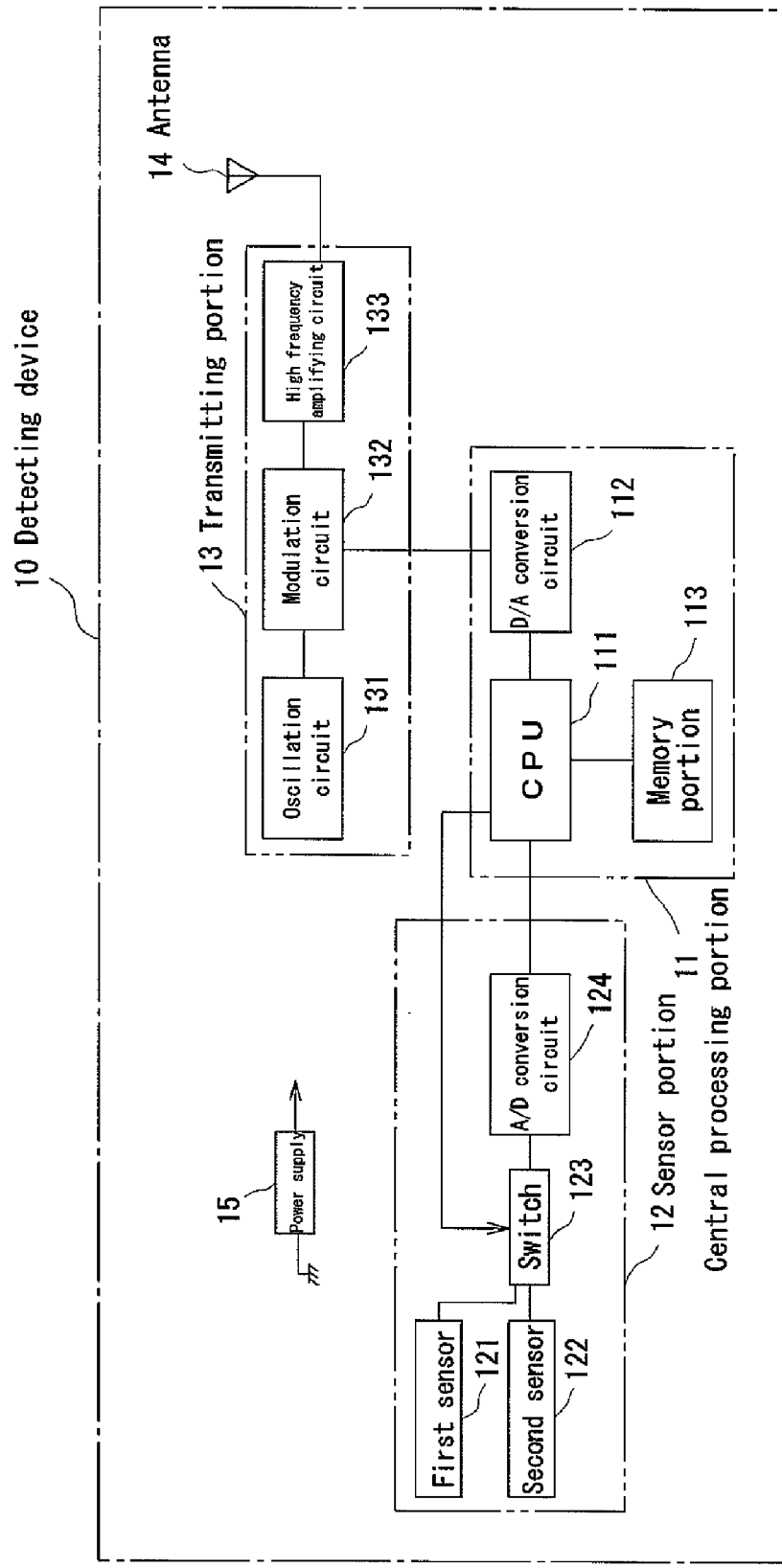
FIG. 3 is a block diagram illustrating an electrical circuit of a detecting device in the first embodiment according to the present invention.
Figure 4:
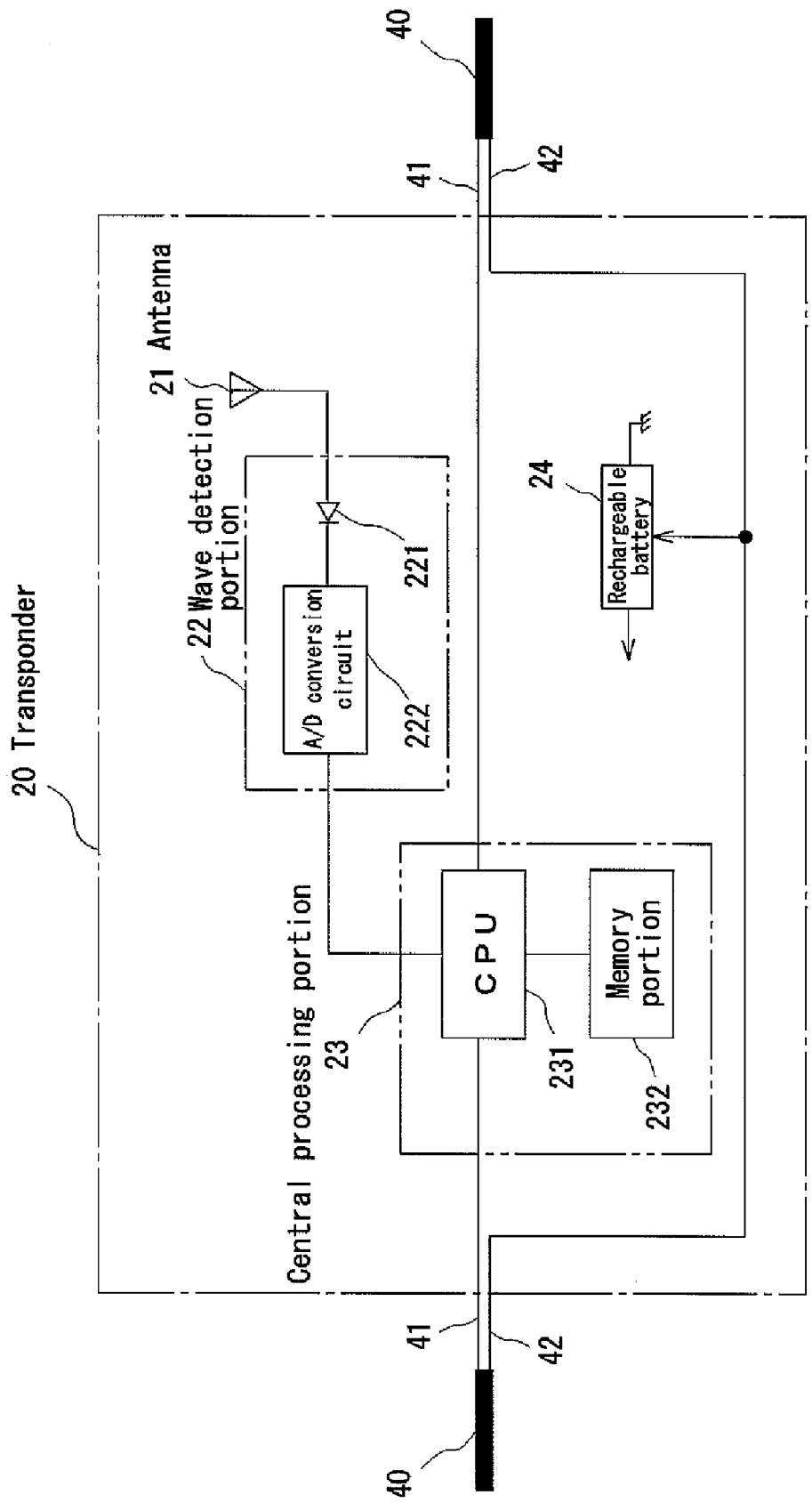
FIG. 4 is a block diagram illustrating an electrical circuit of a transponder in the first embodiment according to the present invention.
Figure 5:
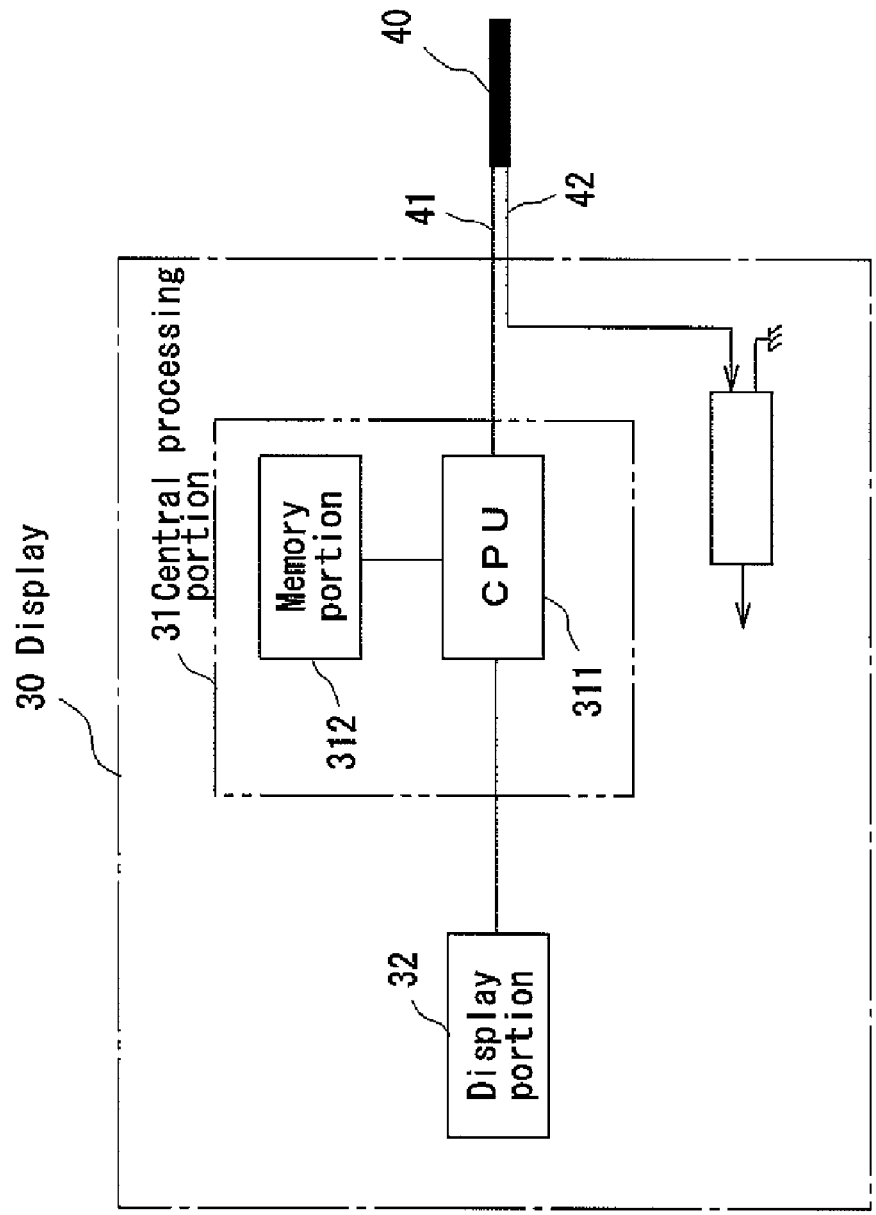
FIG. 5 is a block diagram illustrating an electrical system of a display in the first embodiment according to the present invention.
Figure 6:
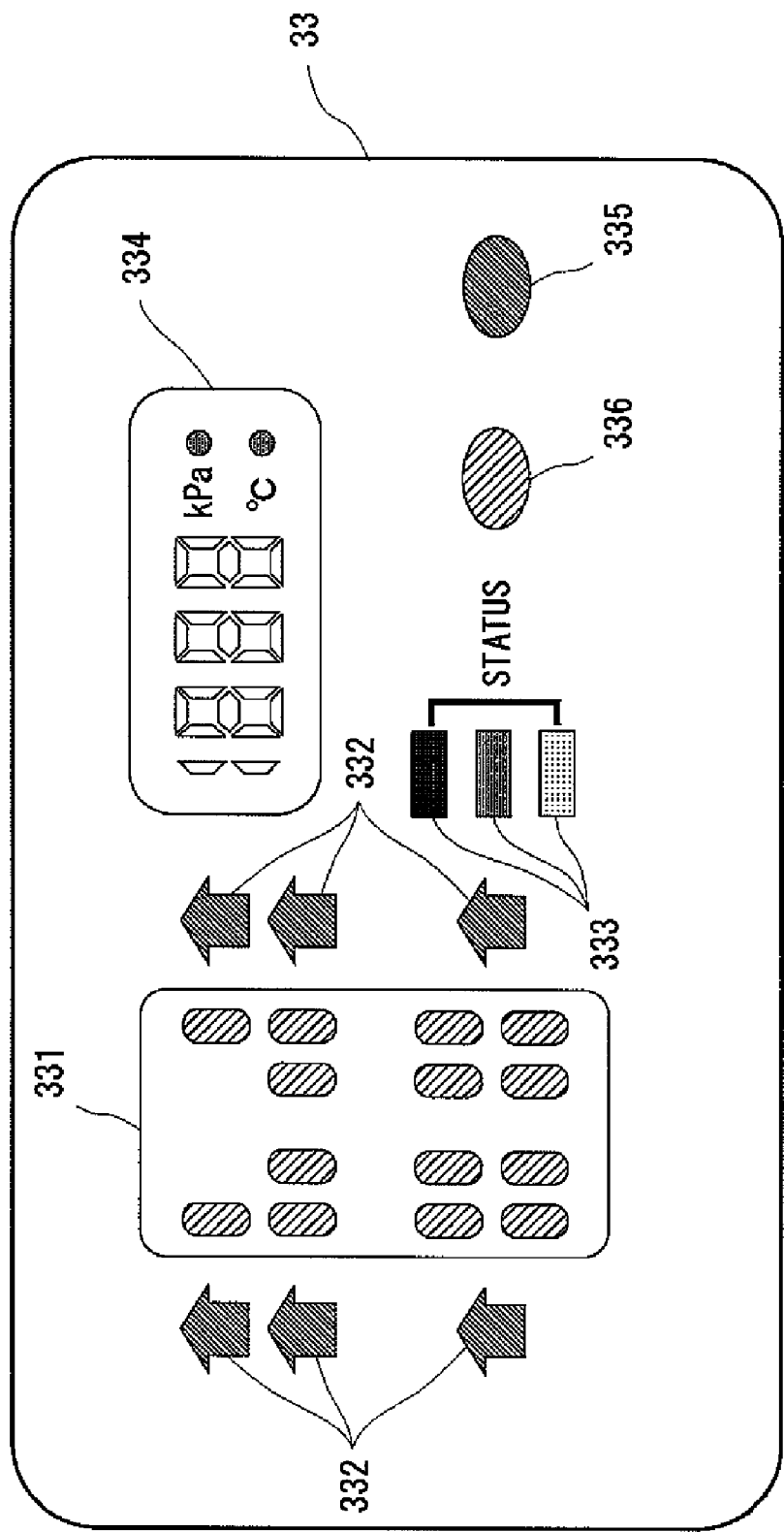
FIG. 6 is a schematic view illustrating a configuration of a display panel of the display in the first embodiment according to the present invention.
Figure 7:
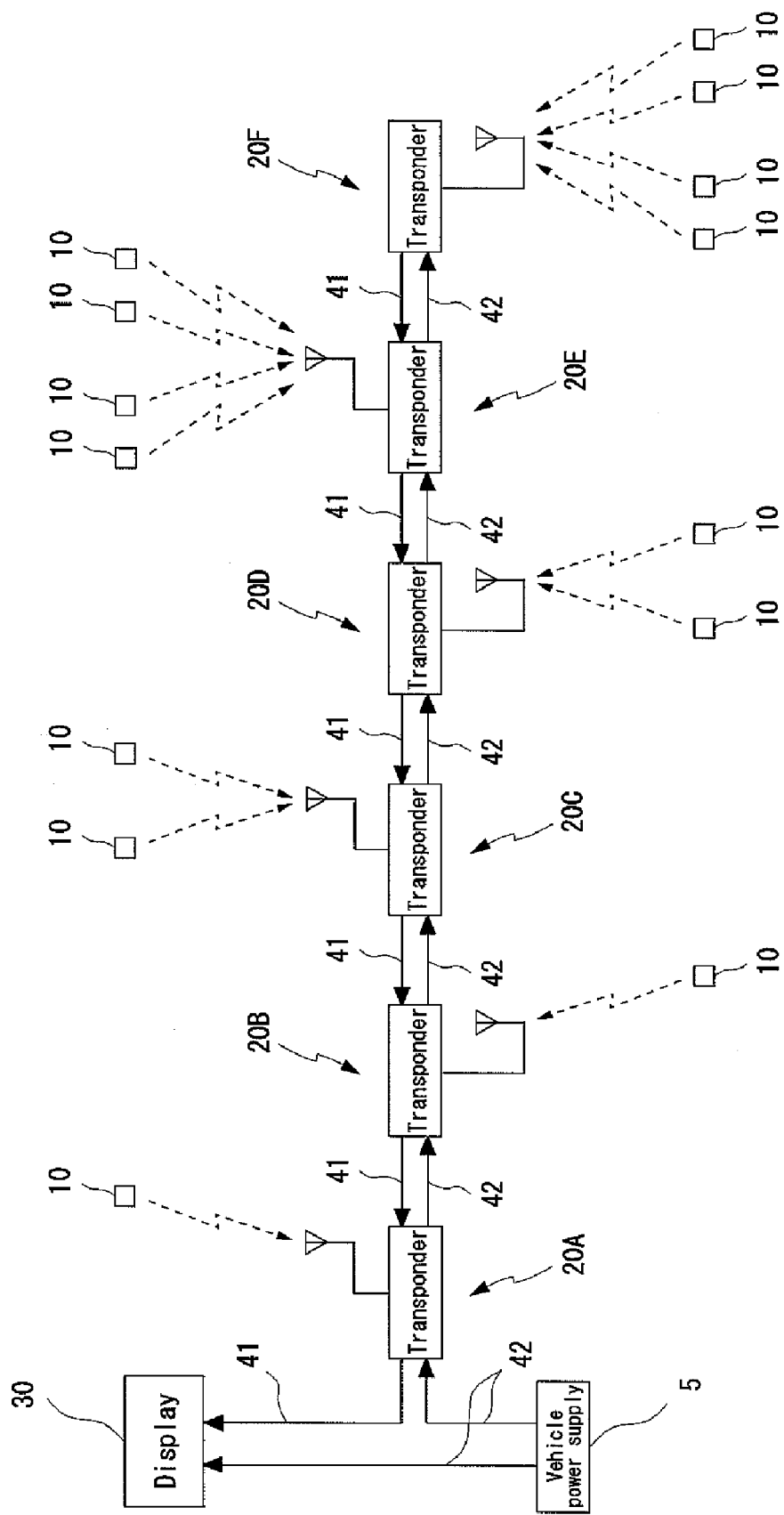
FIG. 7 is a view for explaining operation of the vehicle monitoring system shown in FIG. 2.
Figure 11:
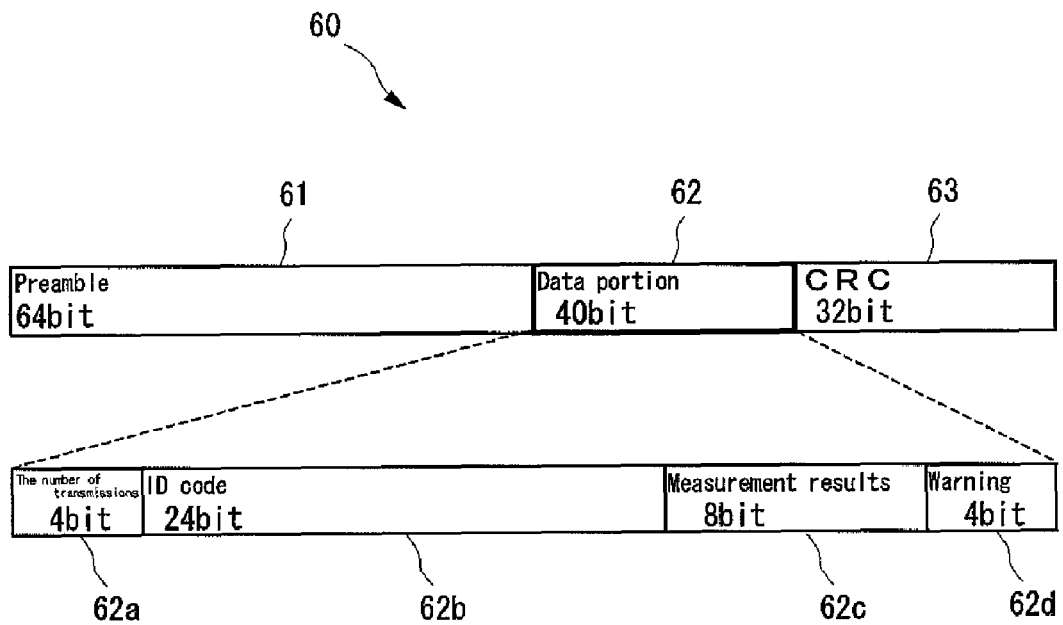
FIG. 11 is a schematic view illustrating a data structure of vehicle data transmitted from the transponder in the first embodiment according to the present invention.
Figure 12:
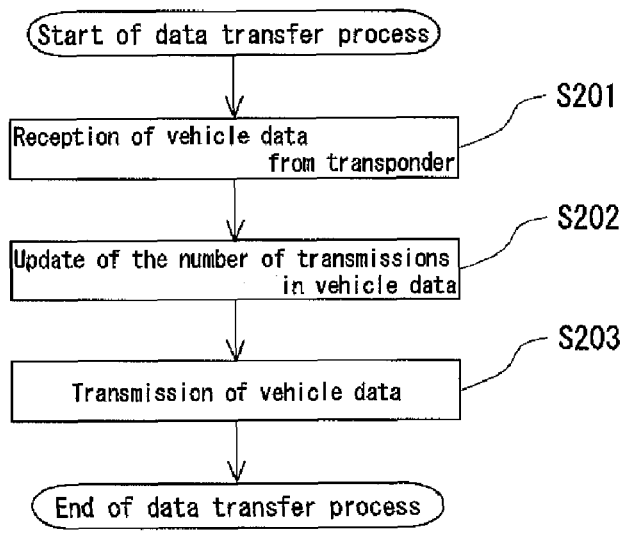
FIG. 12 is a flow chart illustrating the data transfer process shown in FIG. 8.

FIG. 1 is an external perspective view of a combination vehicle which installs a vehicle monitoring system in a first embodiment according to the present invention. FIG. 2 is a top view of the vehicle monitoring system shown in FIG. 1. FIG. 3 is a block diagram illustrating an electrical circuit of a detecting device in the first embodiment according to the present invention. FIG. 4 is a block diagram illustrating an electrical circuit of a transponder in the first embodiment according to the present invention. FIG. 5 is a block diagram illustrating an electrical system of a display in the first embodiment according to the present invention. FIG. 6 is a schematic view illustrating a configuration of a display panel of the display in the first embodiment according to the present invention. FIG. 7 is a view for explaining operation of the vehicle monitoring system shown in FIG. 2. FIG. 8 is a schematic view illustrating a processing configuration of the transponder in the first embodiment according to the present invention. FIG. 9 is a flow chart illustrating the data creation process shown in FIG. 8. FIG. 10 is a view for explaining a registration table stored in the transponder in the first embodiment according to the present invention. FIG. 11 is a schematic view illustrating a data structure of vehicle data transmitted from the transponder in the first embodiment according to the present invention. FIG. 12 is a flow chart illustrating the data transfer process shown in FIG. 8. And FIG. 13 is a view for explaining a registration table stored in the display in the first embodiment according to the present invention.

First, the vehicle monitoring system in the first embodiment according to the present invention will be explained in relation to the overall configuration thereof with reference to FIGS. 1 and 2. In the following description, the portion that is forward as viewed from the traveling direction of the combination vehicle 1 in FIG. 1 is referred to as "front", the portion that is backward is "back", the right portion "right" and the left portion "left".

The combination vehicle 1 is, for example a vehicle that is composed of a tractor 2 and trailer 3. The combination vehicle 1 is not to be limited to a vehicle composed of the statutory tow vehicle and towed vehicle, and it may be the combination vehicle with a semi-trailer shown in FIG. 1, and in addition, a combination vehicle with a full trailer, trailer bus, tanker, camper and a vehicle that is composed of two coupled vehicles, such as a wrecker truck having a pulled car, agrimotor and the like. Further, the number of towed vehicles may be two or more.

The detecting device 10 for detecting conditions of a tire 4 and transmitting measurement results by an electromagnetic wave is embedded in or attached to the surface of each of all the tires 4 provided in the tractor 2 and the trailer 3. Thus, the conditions of all tires 4 provided in the combination vehicle 1 may be detected by the detecting devices 10.

However, the detecting device 10 is not limited to direct attachment to the tire 4, and it may be attached to a wheel or rim etc. to detect the conditions of the tire 4.

Further, the detecting device 10 may be attached to a portion other than those above of the combination vehicle 1 to detect conditions of the combination vehicle 1 other than those of the tire 4, for example, it may be attached to an in-vehicle air tank to detect conditions of air pressure therein.

The transponder 20 for receiving an electromagnetic wave transmitted from one or a plurality of the detecting devices 10 and transmitting data to the display 30 is disposed adjacent to each of the detecting devices 10, for example in each of tire houses or fenders. Thus, disposing the transponder 20 adjacent to each of the detecting devices 10 may allow a faint electromagnetic wave according to the Japanese Radio Regulation Law carrying the measurement results detected by each of the detecting devices 10 to be transmitted and received.

A cable 40 includes a plurality of wires, such as signal lines and power wires, and the signal lines of the cable 40 connect all transponders 20 logically or physically in series, and the display 30 is connected to the distal end portion thereof.

The display 30 is disposed adjacent to a driver seat (not shown) in the tractor 2, and receives and displays the measurement results transmitted from each of the transponders 20 through the signal lines of the cable 40. Thus, the transponder 20 is disposed in each of the tractor 2 and trailer 3, and each of the transponders 20 transmits measurement results to the display 30, and thus the display 30 disposed in the tractor 2 displays conditions of the trailer 3.

Also, power necessary to make each of the transponders 20 and display 30 operate is supplied by a vehicle power supply 5 such as a battery or the like through the power wires of the cable 40.

Next, the configuration of the detecting device shown in FIG. 2 will be explained with reference to FIG. 3.

In FIG. 3, each of the detecting devices 10 includes a central processing portion 11, sensor portion 12, transmitting portion 13, antenna 14 and power supply 15.

The central processing portion 11 includes a known CPU 111, Digital/Analog (hereinafter, referred to as "D/A") conversion circuit 112 and memory portion 113.

The CPU 111 operates according to a program stored in semiconductor memory of the memory portion 113 and inputs the measurement results detected by the sensor portion 12 into the transmitting portion 13 through the D/A conversion circuit 112.

The memory portion 113 includes a ROM having the program for operation of the CPU 111 stored, nonvolatile semiconductor memories such as an EEPROM (electrically erasable and programmable read-only memory) or SRAM (static random-access memory), and the like. Identification information unique to each of the detecting devices 10 is registered in advance at manufacturing stage in a specified area of the memory portion 113 not allowed to be rewritten.

The sensor portion 12 includes a first and second sensor 121, 122, switch 123, A/D conversion circuit 124. For the first and second sensor 121, 122, a sensor for detecting physical quantity of the tire 4, converting it to an electric signal and outputting it may be employed and types of sensor include, for example a pneumatic sensor, temperature sensor, humidity sensor, range sensor and acceleration sensor. Further, if conditions of the combination vehicle 1 except for those of the tire 4 are detected, a sensor for detecting information except for the physical quantity may be employed. For example, a camera or back sonar for monitoring the backside of the combination vehicle 1 and the like may be employed.

In this embodiment, a pneumatic sensor for detecting an internal air pressure of the tire 4 and outputting a voltage corresponding to the air pressure is used for the first sensor 121, and a temperature sensor for detecting an internal temperature of the tire 4 and outputting a voltage corresponding to the temperature is used for the second sensor 122. Moreover, the number of the sensors used is not to be limited to two, and if required, the number may be increased or decreased. Thus, the physical quantity of the combination vehicle 1 may be detected.

The switch 123 may be, for example an electronic switch or the like, and connects either an output of the first sensor 121 or an output of the second sensor 122 to an input of the A/D conversion circuit 124 by switching between them according to control of the central processing portion 11.

The A/D conversion circuit 124 converts the output voltage inputted of the first sensor 121 or the output voltage of the second sensor 122 to a digital value and outputs it to the CPU 111. When the CPU 111 receives the measurement results detected by the sensor portion 12, it reads the identification information of the detecting devices 10 registered in the memory portion 113 and inputs it along with the measurement results into the transmitting portion 13 through the D/A conversion circuit 112.

The transmitting portion 13 includes a oscillating circuit 131, modulation circuit 132 and high frequency amplifying circuit 133, modulates a carrier generated by the oscillating circuit 131 based on the signal inputted from the central processing portion 11 in the modulation circuit 132, and supplies the modulated signal to the antenna 14 through the high frequency amplifying circuit 133.

The antenna 14 transmits the signal supplied by the transmitting portion 13 (hereinafter, referred to as "vehicle information") to the transponder 20 using an electromagnetic wave of a frequency in a long or medium wavelength bandwidth.

The power supply 15 powers the central processing portion 11, sensor portion 12 and transmitting portion 13, and works the detecting device 10. In this embodiment, the power supply 15 is incorporated to work the detecting device 10, but not to be limited to this, a power supply formed by a capacitor, rechargeable battery or the like which stores a DC current converted by rectifying from a high frequency current induced in the antenna 14 upon reception of an electromagnetic wave transmitted from the transponder 20 may be employed.

Next, the configuration of the transponder shown in FIG. 2 will be described with reference to FIG. 4.

In FIG. 4, the transponder 20 includes an antenna 21, wave detection portion 22, central processing portion 23 and rechargeable battery 24.

The antenna 21 is tuned to a frequency in a long or medium wavelength bandwidth to receive an electromagnetic wave transmitted from the detecting device 10.

The wave detection portion 22 includes a diode 221 and A/D conversion circuit 222. An anode of the diode 221 is connected to the antenna 21, and a cathode is connected to a CPU 231 in the central processing portion 23 through the A/D conversion circuit 222. Thus, vehicle information is converted to digital data by the wave detection portion 22 and inputted into the CPU 231.

The central processing portion 23 includes a known CPU 231 and memory portion 232.

The CPU 231 operates based on a program stored in semiconductor memory of the memory portion 232 and transmits the vehicle information inputted from the wave detection portion 22 and data received from the transponder 20 on the receiving side in form of vehicle data described below to the transponder 20 on the transmitting side or the display 30 through signal lines 41 of the cable 40. Thus, the data inputted into the CPU 231 is transmitted directly in form of digital data. Therefore, the vehicle data have resistance to deterioration or noise and can be received at a longer distance.

The memory portion 232 includes a ROM in which a program for operation of the CPU 231 is stored, volatile semiconductor memories such as an EEPROM or SRAM and the like, and a registration table described below and related to the detecting device 10 from which each of the transponders 20 receive is registered in advance in a specified area allowed to be rewritten.

A rechargeable battery 24 powers the wave detection portion 22 and the central processing portion 23, works the transponder 20 and is charged by the vehicle power supply 5 through power wires 42 of the cable 40. However, without the rechargeable battery 24 incorporated in the transponder 20, the vehicle power supply 5 may power through the power wires 42 of the cable 40.

Next, the configuration of the display shown in FIG. 2 will be explained with reference to FIGS. 5 and 6.

In FIG. 5, the display 30 includes a central processing portion 31 and display portion 32. The display 30 is powered by the vehicle power supply 5 through the power wires 42 of the cable 40.

The central processing portion 31 includes a known CPU 311 and memory portion 312, and the CPU 311 receives data from the transponder 20 on the receiving side through the signal lines 41 of the cable 40 and inputs it into the display portion 32. Further, the memory portion 312 includes a ROM in which a program for operation of the CPU 311 is stored, nonvolatile semiconductor memories such as an EEPROM or SRAM and the like, and data received from the transponder 20 is stored in a specified area allowed to be rewritten. Therefore, since the CPU 311 may read out the latest data stored in the memory portion 312, for example immediately after activation of the vehicle monitoring system, even before transmitting vehicle information by the detecting device 10, the display 30 can display the latest vehicle information.

The display portion 32 displays information based on the measurement results of each detecting device 10 inputted from the CPU 311. Further, the display portion 32 includes a display panel 33 shown in FIG. 6. On the left side of the display panel 33, an attaching location display 331 showing the attaching locations of the detecting devices 10 is disposed, and on each side of it, a transponder display 332 showing the transponder 20 which receives the measurement results from each detecting device 10 is disposed.

On the central portion of the display panel 33, three arrays of LED 333 of red, yellow and green indicating a status of an air pressure or temperature of the tire 4 detected by the detecting device 10 are disposed. Thus, such three arrays of the LED 333 may allow the status composed of warning, caution and normal to be easily recognized visually.

Further, a speech output unit such as a speaker etc. (not shown) may be provided to output three types of audio for indicating the status of the air pressure or inside temperature of the tire 4, enabling recognition of the status. With such a speech output unit employed, it becomes easy to recognize the three states of warning, caution and normal aurally. Moreover, on the upper side of the display panel 33, a numeric display 334 is disposed and the air pressure or temperature of the tire at each attaching location is displayed digitally. Thus, numeric displaying may further display the measurement results in detail.

On the right side of the display panel 33, a transponder display switching button 335 and attaching location display switching button 336 are disposed. Every time the transponder display switching button 335 is pressed, a blinking position of the transponder display 332 switches in turn, and every time the attaching location display switching button 336 is pressed, a blinking position of the attaching location display 331 switches in turn. Herewith, the air pressure or temperature of the tire transmitted from the transponder 20 and the detecting device 10 in the blinking position is displayed in the LED 333 and the numeric display 334. Thus, a combination of operation of buttons may display the vehicle information detected by any of the detecting devices 10.

Next, operation of the vehicle monitoring system configured as described above will be explained with reference to FIGS. 7 to 13.

The transponder 20 disposed in front on the right side in the tractor 2 in FIG. 2 is denoted by 20A, the transponders 20 disposed in front on the left side, in back on the right side and in back on the left side in this order are denoted by 20B to 20D, respectively, and the transponders 20 disposed on the right side and left side in the trailer 3 in this order are denoted by 20E and 20F. Then, each of the transponders 20A to 20F transmits the measurement results in the direction from the transponder 20F to the transponder 20A, and situations of data transmitting and receiving and power supplying in the vehicle monitoring system shown in FIG. 2 may be illustrated as shown in FIG. 7.

Operation of each of the transponders 20A to 20F in FIG. 7 includes a data creation process S100 and data transfer process S200 as shown in FIG. 8.

In the data creation process S100, as shown in FIG. 9, when the transponder 20 receives the vehicle information from the detecting device 10 (S101), the CPU 231 determines whether the identification information included in the vehicle information is present in the registration table stored in the memory portion 232 or not (S102).

Now, the registration table stored in the memory portion 232 in each of the transponders 20A to 20F will be explained.

As shown in FIG. 10, the registration table 50 stores information of all the detecting devices 10 from which each of the transponders 20 receives, in form of record for each of attaching locations.

In a location code 51, a coded attaching location of the detecting device 10 is stored. Further, a code system of the location code 51 may be unique for each of the transponders 20, for example the location code 51 of the transponder 20A is made "A01" then the location code 51 of the transponder 20B may be "A02", thus it is preferable that the location code 51 is unique to each of all the transponders 20A to 20F provided in the combination vehicle 1. In this embodiment, because a vehicle type code (the vehicle type code is denoted by "A" in FIG. 10) representative of locations, the number and the like of the tires 4 provided in the combination vehicle 1 and the tire number (the tire number is denoted by "11 to 14" in FIG. 10) assigned to each of all the tires 4 provided in the combination vehicle 1 and specified by the sequence number from front on the right side to back on the left side are combined, the location code 51 becomes unique in all the combination vehicles 1.

In a detecting device ID 52, the identification information of the detecting device 10 attached to the tire 4 corresponding to the location code 51 is stored.

A first air pressure 53 and a second air pressure 54 store reference values to determine conditions of the air pressure detected by the first sensor 121 of the detecting device 10. A first temperature 55 and a second temperature 56 store reference values to determine conditions of the temperature detected by the second sensor 122 of the detecting device 10. However, the number of the values of the air pressure or temperature to be registered is not to be limited to two, and it may be one or more than two.

Then, in the process at S102, the record of the detecting device ID 52 matched to the identification information included in the vehicle information received is searched for in the registration table 50.

After processing at S102, when the record of the detecting device ID 52 matched to the identification information is present, the CPU 231 creates vehicle data to be transmitted to the transponder 20 on the transmitting side or the display 30 (S103).

Now, the vehicle data created by the CPU 231 of each of the transponders 20A to 20F in the process at S103 will be explained.

As shown in FIG. 11, one vehicle data 60 is composed of 136 bits, that is, a preamble 61 has 64 bits, data portion 62 has 40 bits and CRC has 32 bits.

The preamble 61 stores a predetermined bit pattern to provide timing at which the transponder 20A to 20F on the receiving side or the display 30 receives data.

The data portion 62 includes the number of transmissions 62a composed of 4 bits, ID code 62b of 24 bits, measurement results 62c of 8 bits and warning 62d of 4 bits.

The number of transmissions 62a is reset to "0" when the CPU 231 creates the vehicle data 60 and it is updated every time the CPU 231 receives the vehicle data 60 from the transponder 20 on the receiving side and transmits it to the transponder 20 on the transmitting side or the display 30.

The ID code 62b stores the location code 51 of the record in the registration table 50 stored in the memory portion 232 matched to the identification information included in the signal received from the detecting device 10. Further, if the registration table 50 does not store the location code 51, the detecting device ID 52 is stored in place of the location code 51.

The measurement results 62c stores the air pressure detected by the first sensor 121 or the temperature detected by the second sensor 122 of the detecting device 10 included in the vehicle information received. Further, the warning 62d stores a code indicating the result provided by the CPU 231 which assesses conditions of the air pressure detected by the first sensor 121 or conditions of the temperature detected by the second sensor 122 based on the first air pressure 53 and the second air pressure 54, or the first temperature 55 and the second temperature 56 of the matched record (the code corresponds to the states of warning, caution and normal indicated by the LED 333 on the display panel 33 above). For example, if the air pressure detected by the first sensor 121 is higher than the first air pressure 53, the CPU 231 judges to be normal, if it is between the first air pressure 53 and the second air pressure 54, judges to be caution and if it is lower than the second air pressure 54, judges to be warning, and the CPU 231 inputs the corresponding code (1: normal, 2: caution and 3: warning). Thus, due to conditions of the measurement results being judged based on the values stored in the registration table 50, judgment of the measurement results in the vehicle information transmitted from each detecting device 10 can be made by the transponder 20 based on different criteria for each of the detecting devices 10.

Also, the CRC 63 receives information for error check based on the known method, i.e. CRC (cyclic redundancy check).

Further, in the vehicle data 60 of this embodiment, the measurement results 62c and warning 62d related to only either the air pressure or temperature are inputted, but not to be limited to this, both of the air pressure and temperature may be inputted. Accordingly, the bit length of the vehicle data 60 may be altered.

After the CPU 231 creates the vehicle data 60, it transmits the vehicle data 60 created to the transponder 20 on the transmitting side or the display 30 (S104), and terminates the data creation process S100. Further, after processing in the process at S102, if the record of the detecting device ID 62 matched to the identification information is not present, the processes at S103 and S104 are not carried out, and the data creation process S100 is terminated.

In the data transfer process S200, as shown in FIG. 12, upon reception of the vehicle data 60 above transmitted from the transponder 20 on the receiving side (S201), the CPU 231 adds "1" to the number of transmissions 62a included in the vehicle data 60 to update it (S202), and transmits the updated vehicle data 60 to the transponder 20 on the transmitting side or the display 30 (S203).

Further, the value added upon update may be the same value among the transponders 20A to 20F, and it is not to be limited to "1". Also, not to be limited to addition, subtraction, multiplication or division may be made. Due to the data creation process S100 and data transfer process S200, the vehicle data 60 transmitted from each of the transponders 20A to 20F is received by the display 30, and the latest data is stored in the memory portion 312 and updated in form of record for each of the ID codes 62b. FIG. 13 shows one example of a memory table 70 stored in the memory portion 312.

As shown in FIG. 13, the ID code 62b is stored in an ID code 71, the number of the transmissions 62a is stored in the number of transmissions 72, the measurement results 62c of the air pressure and the warning 62d are stored in a detected air pressure 73 and an air pressure warning 74, respectively, and the measurement results 62c of the temperature and the warning 62d are stored in a detected temperature 75 and a temperature warning 76, respectively.

The number of transmissions 62a in the vehicle data 60 created by the transponder 20 has a initial value "0", and is incremented by "1" every time the transponder 20 on the receiving side performs the transfer process S200, thus the number of transmissions 72 in the memory table 70 stores "0" for the vehicle data 60 transmitted from the nearest transponder 20A to the display 30, and the number of transmissions 72 stores "1" to "5" for the vehicle data 60 transmitted from each of the following transponders 20B to 20F, respectively. Therefore, the display 30 can identify the transponder 20 which creates the vehicle data 60 by referring to the number of transmissions 72 in the memory table 70.

Also, the transponder 20 inputs the location code 51 which is unique for any combination vehicle 1 into the ID code 62b, therefore the display 30 can identify the detecting device 10 which detects the vehicle information by referring to the ID code 71 in the memory table 70, and further identify the attaching location of that detecting device 10.

Further, if the transponder 20 inputs a location code which is unique for each of the transponders 20 as the location code 51 into the ID code 62b, then the display 30 can identify the detecting device 10 which detects the vehicle information by referring to the ID code 71 and the number of transmissions 72, and further identify the attaching location of that detecting device 10.

Therefore, the display 30 can blink the transponder display 332 and attaching location display 331 on the display panel 33, and also display the detected air pressure 73 and air pressure warning 74, or the detected temperature 75 and temperature warning 76 in the LED 333 and numeric display 334, respectively.

Also, if the detecting device ID 52 is inputted into the ID code 62b in place of the location code 51, then the display may not identify the attaching location of the detecting device 10, but it can identify the detecting device 10 which detects that data by referring to the ID code 70 and the number of transmissions 72.

Thus, according to the vehicle monitoring system which is configured and operates as described above, the transponder 20 receives only the vehicle information transmitted from the detecting device 10 registered in advance, and the number of transmissions 62a included in the vehicle data 60 is updated every time the vehicle data 60 transmitted from the transponder 20 on the receiving side is transferred to the transponder 20 on the transmitting side or the display 30, and thus the display 30 which receives the vehicle data 60 in the distal end of the transponders 20 all connected in series through the cable 40 can identify the transponder 20 which creates and transmits the vehicle data 60 based on the number of transmissions 62a included in the vehicle data 60. Accordingly, for example, when the trailer 3 towed by the tractor 2 is replaced, then without registration on the display 30 of the identification information of each detecting device 10 provided in a new trailer 3, the detecting device 10 can be easily identified due to the number of transmissions 62a and ID code 62b included in the vehicle data 60 transmitted from the transponder 20.

Also, the transponder 20 inputs the location code 51 of the detecting devices 10 registered in advance into the ID code 62b, and transmits the vehicle data 60 to the transponder on the transmitting side or the display, thus the display 30 can identify the attaching location of the detecting device 10 which transmits the vehicle information based on the ID code 62b, or the number of transmissions 62a and ID code 62b included in the vehicle data 60. Accordingly, the display 30 can blink the transponder display 332 and attaching location display 331 on the display panel 33, and also display the detected air pressure 73 or detected temperature 75 in the numeric display 334.

Further, the transponder 20 judges conditions of the physical quantity detected by the detecting device 10 based on the first air pressure 53 and second air pressure 54, or the first temperature 55 and second temperature 56 registered in advance, and provides and inputs the judgment into the warning 62d, and transmits the vehicle data 60, thus the display 30 can determine the condition of the physical quantity detected by the detecting device 10 based on the warning 62d included in the vehicle data 60. Accordingly, it is unnecessary for the display 30 to register a threshold value for the physical quantity detected by each detecting device 10, and it can display the air pressure warning 74 or temperature warning 76 by the LED 333 on the display panel 33.

Next, a second embodiment of the present invention will be explained.

Figure 14:
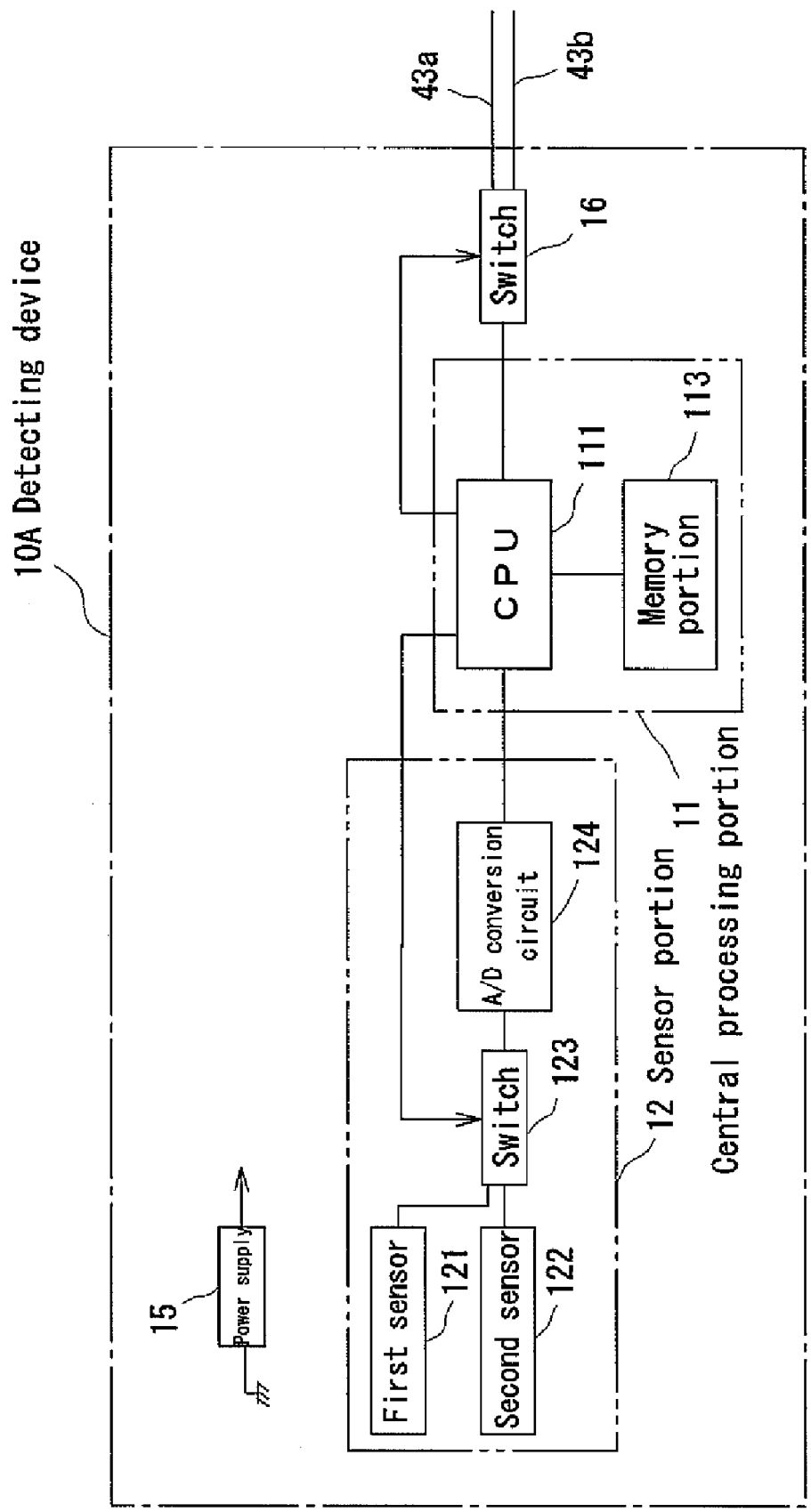
FIG. 14 is a block diagram illustrating an electrical circuit of a detecting device in a second embodiment according to the present invention.
Figure 15:
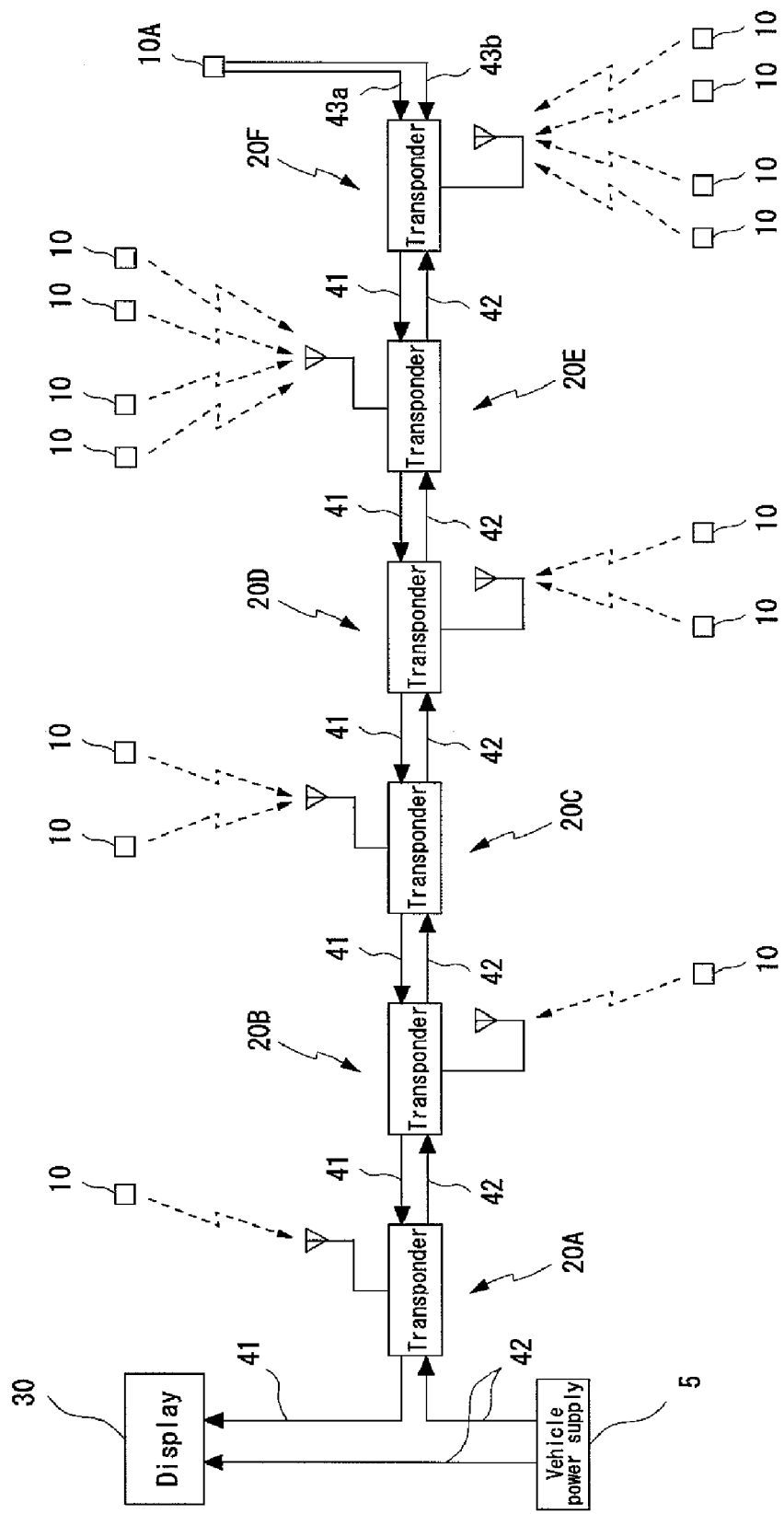
FIG. 15 is a view for explaining operation of a vehicle monitoring system in the second embodiment according to the present invention.
Figure 16:
FIG. 16 is a view for explaining a registration table stored in the transponder in the second embodiment according to the present invention.

FIG. 14 is a block diagram illustrating an electrical circuit of a detecting device in the second embodiment according to the present invention. FIG. 15 is a view for explaining operation of a vehicle monitoring system in the second embodiment according to the present invention. And FIG. 16 is a view for explaining a registration table stored in the transponder in the second embodiment according to the present invention. In these drawings, the like components as the first embodiment above described are denoted by the like symbols and the explanation thereof will be omitted.

The second embodiment is different from the first embodiment in the points that, in the second embodiment, in addition to the detecting device 10 which transmits the vehicle information through the antenna, a detecting device 10A is provided which is connected to the transponder 20 through communication lines 43a, 43b dedicated to the first and second sensor 121, 122 and transmits the measurement results detected by the first and second sensor 121, 122.

In the detecting device 10A, as shown in FIG. 14, the antenna and transmitting portion become unnecessary, because the measurement results (hereinafter, referred to as "vehicle information") are transmitted through two cable, i.e. the communication lines 43a, 43b, and also, a switch 16 for switching between the communication lines 43a and communication lines 43b is provided to select the first sensor 121 or the second sensor 122 for information source of the vehicle information according to control of the central processing portion 11.

Further, as for the first and second sensor 121, 122, a sensor which detects a state of "ON" and "OFF" of a switch provided in the combination vehicle 1, generates an electric signal and outputs it, for example a sensor for detecting opening or closing movement of a door, connection of a vehicle, or failure in a lamp is employed. In this embodiment, the first sensor 121 may be a door sensor for detecting opening or closing movement of a cargo compartment door and the second sensor 122 may be a vehicle connection sensor for detecting a state of connection between the tractor 2 and trailer 3. Further, the number of the sensors is not to be limited to two similarly to the first embodiment.

The detecting device 10A, as shown in FIG. 15, may be connected to the transponder in the trailer 3, for example the transponder 20F.

In the memory portion 232 of the transponder 20F, in addition to the registration table 50 shown in FIG. 10, a registration table 50A shown in FIG. 16 is stored.

In a communication code 51A, a code formed by coding the communication lines 43a, 43b connecting the detecting device 10A is stored. Further, a code system of the communication code 51A may be preferably defined in the like way as the code system of the location code 51 above. In this embodiment, because a vehicle type code (the vehicle type code is denoted by "A" in FIG. 15) and communication line numbers assigned to all the communication lines 43a, 43b provided in that combination vehicle 1 (the communication line numbers are denoted by "YY" and "ZZ" in FIG. 15 and do not overlap with the tire numbers described above) are combined, then the communication code 51A is unique for any combination vehicle 1.

The identification information of the communication lines 43a, 43b is stored in a communication ID 52A and it is usually a board address of the CPU 231 or the like. Therefore, the communication lines 43a, 43b are not necessarily two cables in physical form and may be distinguishable communication paths by the CPU 231. Also, the communication path is not to be limited to wired means such as a cable, may be wireless means.

Further, when the CPU 231 of the transponder 20 creates the vehicle data 60 based on the vehicle information received from the communication lines 43a, 43b, it inputs the communication code 51A of the record matched to the identification information of the communication lines 43a, 43b into the ID code 62b.

Therefore, according to the vehicle monitoring system which is configured and operates as described above, since the detecting device 10A transmits the vehicle information through the communication lines 43a, 43b dedicated to the first sensor 121 or second sensor 122, then the same advantage as the first embodiment may be achieved with the identification information of the detecting device 10A not being included in the vehicle information.

Further, a vehicle monitoring system may be configured by combining or partially replacing the configurations or operations of the embodiments described above.

Also, each of the embodiments above is a specific example, therefore the present invention is not to be limited to these in relation to configuration or operation, and modifications may be made without departing from the spirit and range of the present invention.

INDUSTRIAL APPLICABILITY

According to a vehicle monitoring system which includes a transponder receiving measurement results from a detecting device which detects and transmits conditions in a predetermined portion of a vehicle and a display for displaying the measurement results transmitted from the transponder, the detecting device can be easily identified without registration on the display of identification information of each of the detecting devices, thus the vehicle monitoring system may have applications in a combination vehicle in which conditions of the vehicle such as an inside air pressure or temperature of a tire and the like are monitored.

The invention claimed is:

1. A vehicle monitoring system, comprising:
a plurality of transponders connected in series via one or more cables;
one or more detectors, wherein each detector corresponds to a particular transponder and is configured to detect conditions in a particular predetermined portion of a vehicle and transmit vehicle data including condition data indicative of the conditions detected by the detector and identification data indicative of an identity of the detector; and a display connected to one of the transponders disposed at a distal end of the plurality of transponders, and the display configured to receive and display the condition data;

wherein each transponder is configured to:
  determine, for each detector from which vehicle data is transmitted, based on the identification data included in the transmitted vehicle data, whether to receive the transmitted vehicle data,
  receive the vehicle data determined to receive,
  receive, from a proximal-side transponder, vehicle data including a number of transmissions,
  modify the vehicle data from the proximal-side transponder by incrementing the number of transmissions, and
  transmit, to a distal-side transponder or the display, the received vehicle data from the one or more detectors and the modified vehicle data.

2. The vehicle monitoring system according to claim 1, wherein the display is further configured to display which transponder in the plurality of the transponders transmits the vehicle data based on the number of transmissions.

3. The vehicle monitoring system according to claim 1, wherein the one or more detectors are disposed at any of a plurality of predetermined locations defined for each type of vehicle, and at least one of the transponders is configured to add location data to the vehicle data based on the identification data and attaching location of the one or more detectors corresponding to the transponder.

4. The vehicle monitoring system according to claim 3, wherein the display is configured to display which predetermined location of the plurality of the predetermined locations the vehicle data is transmitted from, based on the location data added to the vehicle data.

5. The vehicle monitoring system according to claim 1, wherein at least one of the detectors comprises a sensor for detecting a predetermined physical quantity, and at least one of the transponders is configured to add warning data to the vehicle data based on the detected physical quantity and at least one predetermined threshold value.

6. The vehicle monitoring system according to claim 5, wherein the display is configured to display a particular color indicative of the detected physical quantity based on the warning data.

7. The vehicle monitoring system according to claim 5, wherein the display is configured to output audio indicative of the detected physical quantity based on the warning data.

8. The vehicle monitoring system according to claim 5, wherein the predetermined physical quantity comprises at least one of an air pressure, temperature, humidity, distance and acceleration.

9. The vehicle monitoring system according to claim 1, wherein:
  the vehicle comprises a tractor and at least one trailer;
  the each transponder is provided by at least one in each of the tractor and trailer; and
  the display is provided in the tractor.

10. The vehicle monitoring system according to claim 1, wherein:
  at least one of the detectors comprises an antenna for transmitting the vehicle data; and
  at least one of the transponders is configured to convert the vehicle data received via the antenna to a digital signal.

11. The vehicle monitoring system according to claim 1, wherein at least one of the detectors is attached to each of all wheels provided in the vehicle.

12. The vehicle monitoring system according to claim 1, further comprising a storage for storing at least the detected physical quantity, the identification data and the number of transmissions.

13. The vehicle monitoring system according to claim 1, wherein:
  at least one of the detectors comprises a transmitter for transmitting the vehicle data having at least the detected physical quantity through a dedicated communication path; and
  at least one of the transponders comprises a receiver for receiving the vehicle data transmitted from the at least one detector through the dedicated communication path, and a processor for adding path data indicative of the dedicated communication path to the vehicle data based on path identification data.

14. The vehicle monitoring system according to claim 1, wherein a least one of the detectors comprises at least one sensor for detecting a state of "ON" and "OFF" of a predetermined switch provided in the vehicle.

15. A transponder connected in series with one or more other transponders via one or more cables of which a display is connected to one of the transponders disposed at a distal end of the transponders connected in series, the transponders to which one or more detectors are corresponding of which each transponder configured to detect conditions in a particular predetermined portion of a vehicle and transmit vehicle data including condition data indicative of the conditions detected by the detector and identification data indicative of an identity of the detector, the transponder comprising:
  a processor configured to determine, for each detector from which vehicle data is transmitted, based on the identification data included transmitted vehicle data, whether to receive the transmitted vehicle data;
  a first receiver configured to receive the vehicle data determined to receive;
  a second receiver configured to receive, from a proximal-side transponder, vehicle data including a number of transmissions;
  wherein the processor is further configured to modify the vehicle data from the proximal-side transponder by incrementing the number of transmissions; and
  a transmitter configured to transmit, to a distal-side transponder or the display, the received vehicle data from the one or more and the modified vehicle data.

16. The transponder according to claim 15, wherein:
  the detectors are attached to a predetermined location defined for each type of vehicle; and
  the processor is further configured to add location data to the vehicle data based on the identification data and attaching location of a corresponding detector.

17. The transponder according to claim 15, wherein:
  at least one of the detectors comprises a sensor for detecting a predetermined physical quantity; and
  the processor is further configured to add warning data to the vehicle data based on the detected physical quantity and at least one predetermined threshold value.

18. The transponder according to claim 15, wherein:
  at least one of the detectors comprises an antenna for transmitting the vehicle data;
  the processor is configured to convert the vehicle data received via the antenna to a digital signal.

19. The transponder according to claim 15, wherein:
at least one of the detectors is configured to transmit the vehicle data through a dedicated communication path; and the processor is configured to add path data indicative of the dedicated communication path to the vehicle data.

* * * * *